United States Patent [19]
Toepper

[11] 3,740,832
[45] June 26, 1973

[54] METHOD OF FABRICATING A FLEXIBLE CONNECTOR
[75] Inventor: George G. Toepper, Elgin, Ill.
[73] Assignee: Universal Oil Products Company, Des Plaines, Ill.
[22] Filed: Nov. 18, 1971
[21] Appl. No.: 199,973

Related U.S. Application Data
[63] Continuation-in-part of Ser. No. 23,354, March 27, 1970, Pat. No. 3,627,354.

[52] U.S. Cl.......................... 29/508, 29/516, 29/525
[51] Int. Cl........................ B21d 39/00, B23p 11/02
[58] Field of Search.................... 29/508, 516, 525, 29/454; 285/381, 382, 382.7, 114; 138/124

[56] References Cited
UNITED STATES PATENTS
| 351,263 | 10/1886 | Hemphill | 285/381 |
| 2,026,166 | 12/1935 | Guarnaschelli | 285/382 X |
| 2,028,600 | 1/1936 | Guarnaschelli | 285/382 X |
| 2,357,669 | 9/1944 | Lake | 29/525 UX |
| 2,300,547 | 11/1942 | Guarnaschelli | 138/124 X |
| 2,431,633 | 11/1947 | Brown | 285/382.7 X |
| 2,444,988 | 7/1948 | Guarnaschelli | 285/114 X |
| 2,556,544 | 6/1951 | Johnson | 29/508 UX |
| 3,149,860 | 9/1964 | Hallesy | 29/525 UX |

Primary Examiner—Charlie T. Moon
Attorney—James R. Hoatson, Jr. et al.

[57] ABSTRACT

Method of fabricating a flexible connector. A tubular member, is corrugated in a central portion thereof and a sleeve of braided strands is disposed around the tubular member to encompass the corrugated central portion and overlap at least a part of the uncorrugated end portions. A collar is disposed in a force fit manner around each end of the sleeve to overlap the part covering an uncorrugated end portion to thus secure the sleeve in place and provide reinforcement for the corrugated portion of the tubular member.

10 Claims, 13 Drawing Figures 3,740,832

METHOD OF FABRICATING A FLEXIBLE CONNECTOR

This is a continuation-in-part application of my copending application Ser. No. 23,354, filed Mar. 27, 1970, now U.S. Pat. No. 3,627,354.

BACKGROUND OF THE INVENTION

The present invention relates to a method of fabricating a reinforced flexible connector.

In the past, reinforced flexible connectors have been fabricated by first forming a corrugated tubular member. To the ends of the corrugated member, tubular uncorrugated extensions were joined by soldering, brazing, or welding. A sleeve of braided material was then disposed around the corrugated tubular member and soldered, brazed, or welded to the extensions. This particular arrangement tended to lead to problems of leakage and failure due to improper attachment of the components. It also presented a problem when it was installed into a unit of assembly by welding, soldering or brazing methods. That is, a possibility arose that in applying heat during the joining operation, careless workmanship would adversely affect the brazed joints of the braid and tubular end portions of the connector. Also, this particular type of fabrication did not lend itself to the use of different materials, such as plastic for the braid and copper for the corrugated tubular member.

SUMMARY

Thus, it is a principal object of this present invention to provide for a method for making a reinforced flexible connector.

More particularly, it is an object of this present invention to provide for a method for making a reinforced flexible connector, the resulting connector having a construction which eliminates the problems of possible leakage and failure due to improper attachment of the reinforcing means.

It is also an object of this present invention to provide for a method of making a reinforced flexible connector, the resulting connector having a construction which will not deteriorate under careless installation procedures.

Also, it is an object of this invention to provide for a method of making a reinforced flexible connector, the resulting connector having as a reinforcement means a sleeve of braided strands which is attached to a corrugated tube by mechanical means.

In a broad aspect the present invention provides for a method of fabricating a flexible connector in a manner eliminating soldering or other heat fusing operation. The method comprises the steps of: corrugating the central portion of a tubular member whereby the resulting corrugations will provide flexibility in said central portion thereof and whereby the end portions of said tubular member will be uncorrugated; placing a sleeve of braided strands around said tubular member to completely encompass said corrugated central portion thereof and to overlap at least part of said uncorrugated end portions; and, disposed in a force fit manner a collar around each end of said sleeve of braided strands over at least a part of said sleeve where the latter overlaps said uncorrugated end portion to thereby mechanically secure said sleeve of braided strands in a fixed relationship with said uncorrugated end portions of said tubular member, whereby said sleeve of braided strands will provide a flexible reinforcement for said corrugated central portion of said tubular member.

In corrugating the central portion of the tubular member, there are various methods and means known by those skilled in the art to produce various forms of corrugations. For example, annular corrugations may be formed by axial compression of a tubular member by opposing dies shaped to correspond to the desired corrugation. Preferably, however, the corrugations are formed by a method similar to that which is disclosed in U.S. Pat. Nos. 3,128,821 and 3,353,389. The corrugations formed by such methods are helically shaped. Basically, the method includes forming helical corrugations by drawing the tubular member through first and second axially spaced apart generally synchronously rotating annular forming discs or dies radially offset one from the other transverse to said tubular member, wherein the corrugations are formed by indenting the tubular member by rotating the first disc with respect to the tubular member and by rotating the second disc with respect to the tubular member. To provide for the uncorrugated end portions of the tubular member of this invention the method is varied to the extent that as the tube is being drawn through the disc where no corrugations are desired, the discs are caused to be moved transversely outward to be spaced from the tubular member.

Preferably, to provide greater longitudinal strength in the mechanical force fit the tubular member is gradually reduced in cross-sectional area in proximity to both ends over at least a part of the uncorrugated end portions to form spaced apart frusta-conical portions decreasing in cross-sectional area toward the ends of the tubular member. When this is done, the sleeve of braided material is caused to overlap at least a part of the frusta-conical portions. Thereafter, the collars are disposed over part of the sleeve where it overlaps the frusta-conical portions to provide for the mechanical fit.

For a more complete understanding of the present invention and for further objects and advantages thereof, reference may now be made to the accompanying diagrammatic drawing and the following description thereof.

Figure 1:
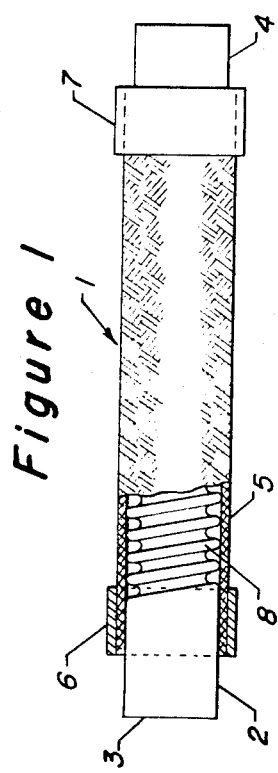
FIG. 1 is a schematical elevational view, shown partially in section, of one of the embodiments of the reinforced flexible connector fabricated by the method according to the present invention.

Referring now more particularly to FIG. 1 of the drawing, there is shown the flexible connector 1 which includes a tubular member 2 having a central corrugated portion 8 and uncorrugated end portions 3 and 4. The corrugated portion 8 must be flexible in nature. To provide for this flexible quality, it is considered generally necessary that the material used for its construction should be malleable to a certain extent. Also, of course, the material must have relatively thin walls to provide for the requirement of flexibility. These requirements of malleability and thin walls are also necessary since the fabrication of the corrugated section will be typically accomplished under cold conditions. Of course, copper, most of the copper and steel alloys and many other metals and metallic alloys will satisfy the malleable requirement. Also to be considered for use as the material for the tubular member are the non-metallic malleable materials, such as the many plastics that are now known.

Schematically shown, partially in section, is a sleeve of braided strands 5 which is disposed around the tubular member to encompass the corrugated central portion 8 and to overlap part of the end portions 3 and 4. The nature of the sleeve of braided strands is that it is flexible for the purposes of bending, but is is relatively rigid in the longitudinal direction. Disposed around the sleeve 5 are a pair of collars 6 and 7 which may be of the same material as the tubular member 2 and/or braid 5 or, on the other hand, may be of another material since the components are not brazed to the braid and to the tubular member but are disposed in a force fit manner to provide a resulting mechanical secure fit.

Thus, the sleeve of braided strands is fixed in relationship with the uncorrugated end portions 3 and 4 to provide a flexible reinforcement for the corrugated central portion 8 of the tubular member. It is noted that characteristic to this particular connector, end portions 3 and 4 have been made long enough to extend beyond the collars to thus provide a means by which the connector may be brazed to a threaded fitting or to a unit of assembly.

Figure 2:
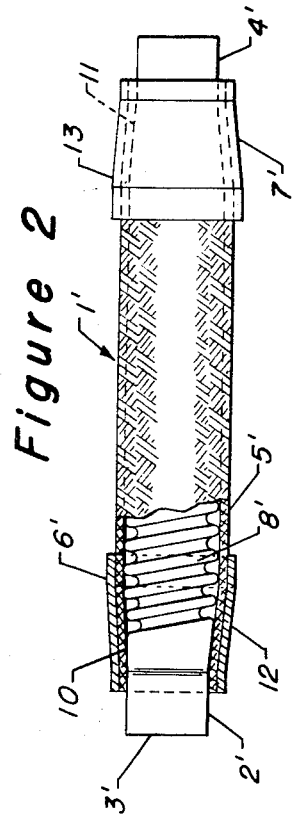
FIG. 2 is an elevational view, shown partially in section, of a preferred embodiment of the flexible connector fabricated by the method according to the present invention.

FIG. 2 illustrates a preferred embodiment of the present invention in which a lesser degree of a force fit for collars is required for the same longitudinal strength.

The actual configuration is very similar to that of FIG. 1. That is, the connector 1' includes a tubular member 2' with a corrugated central portion 8' and uncorrugated end portions 3' and 4'. The variation is manifested in the fact that the tubular member has frusta-conical portions 10 and 11 of decreasing cross-sectional area toward the ends of the tubular member. These frusta-conical portions may be disposed to include both the uncorrugated end portions 3' and 4' and the corrugated central portion 8' as shown in FIG. 2 or, on the other hand, may be disposed to only include the uncorrugated end portions 3' and 4'. However, they must be disposed to include at least part of the uncorrugated end portions 3' and 4'. The sleeve of braided material 5' must be disposed around the tubular member to overlap at least part of the frusta-conical portions as shown in FIG. 2. To maintain the sleeve in a fixed relationship with the uncorrugated end portions of the tubular member of collars 6' and 7' are disposed in a force fit manner around the ends of the sleeve and are preferably disposed over at least a part of the sleeve where the latter overlaps the frusta-conical portion as shown in FIG. 2. Thus, the collars 6' and 7' must have frusta-conical portions 12 and 13. This particular arrangement will add to the strength of the force fit when a tension load is applied to the ends of the tubular member.

Figure 12:
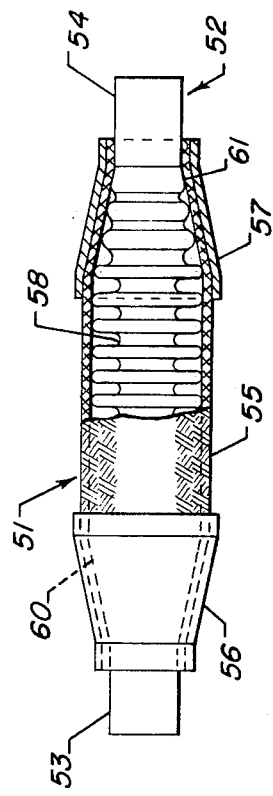
FIG. 12 of the drawing is a modified embodiment of the reinforced flexible connector fabricated by the method according to the present invention.

Reference is now made to FIG. 12 of the drawing where a flexible connector 51 fabricated from an annular corrugated tubular member 52 is shown. The main distinction of connector 51 from the connectors of FIGS. 1 and 2 is of course the use of tubular member 52 having an annular corrugated central portion 58 and uncorrugated end portions 53 and 54. In this particular embodiment the end have been swaged to have frusta-conical portions 60 and 61 of decreasing cross-sectional area toward the ends of the tubular member 52. As shown, the frusta-conical portions 60 and 61 may include both the uncorrugated end portions 53 and 54 and the corrugated central portion 58 although it may be desirable to only reduce the cross-section of the uncorrugated end portions. A sleeve of braided material 55 is disposed around the tubular member 52 to overlap the frusta-conical portions. Collars 56 and 57 are disposed in a force fit manner around the ends of the sleeve where the latter overlaps the frusta-conical portion of the uncorrugated end portions 53 and 54.

One method of fabricating the flexible connector follows, and for simplicities sake, the numeral designations of FIGS. 2 and 12 are used in conjunction with the description thereof, unless otherwise specified. As set out heretofore, the method of fabricating the flexible connector of FIG. 1, FIG. 2 and FIG. 12 includes corrugating the central portion of the tubular member to provide the resulting corrugations which will provide the flexibility in the central portion of the tubular member. There are numerous known methods of corrugating tubing to form resulting corrugations of various shapes, strengths, etc. The corrugations of this invention should not be limited to the ones shown in the drawings.

Figure 3:
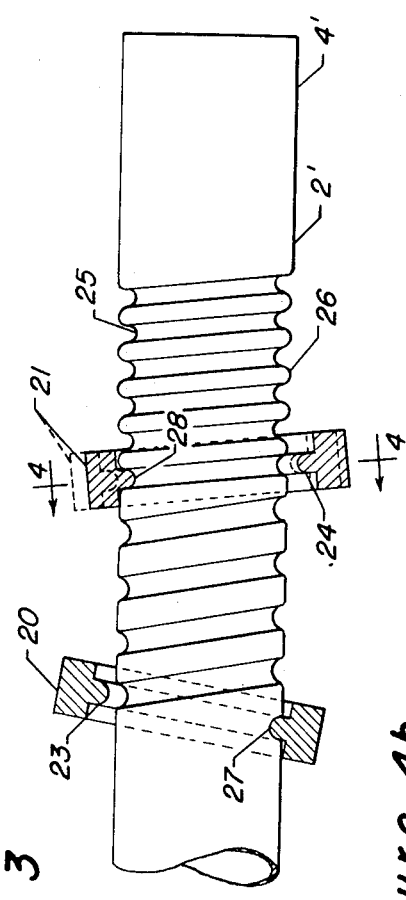
FIG. 3 is a simplified elevational view of the tubular member of the flexible connector and the forming discs employed in helically corrugating the central portion of the tubular member.
Figure 4A:
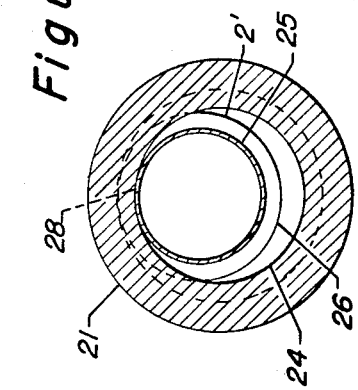
FIG. 4a is a sectional view of FIG. 3 as taken through section line 4—4.
Figure 4B:
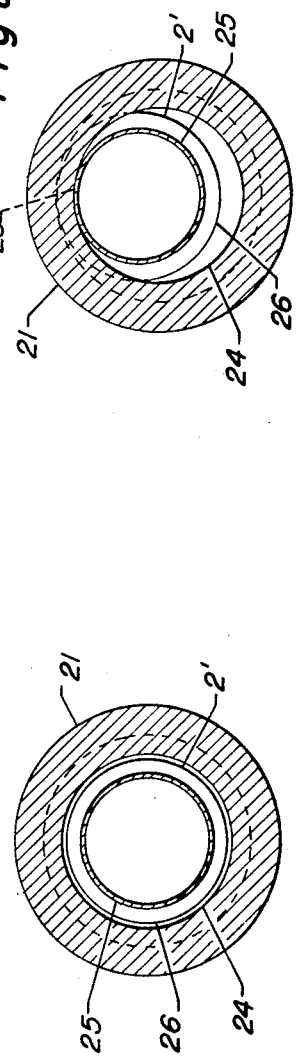
FIG. 4b is a sectional view of FIG. 3 as taken through section line 4—4 illustrating the position of the discs when not indenting the tubular member.

The preferred mode of forming helical corrugations is illustrated in FIGS. 3, 4a, and 4b. It is to be noted that the apparatus on which such corrugating may be effectuated, with possible minor variations, is disclosed in U.S. Pat. Nos. 3,353,389 and 3,128,821. The method of corrugating includes forming helical corrugations by drawing a tubular member 2' through a first annular forming disc or die 20 and a second axially spaced apart generally synchronously rotating annular forming disc or die 21. The forming discs 20 and 21 are radially offset one from the other which is manifested by the fact that the forming portions 23 and 24 are contacting the tubular member 2' at opposite sides, 27 and 28, of the tubular member. It is also to be noted that the forming discs are generally transverse to the tubular member. The corrugations are formed by indenting the tubular member by rotating the first disc 20 with respect to the tubular member and by rotating the second disc 21 with respect to the tubular member as it is drawn through the discs. The forming portions 23 and 24 of the discs form indentations 25 with the resulting ridges 26. FIG. 4a shows the relative location of one of the forming discs 21 and the tubular member 2' as the tubular member is being corrugated or indented. To provide for the uncorrugated end portions of the tubular member a provision is provided in the apparatus in which the discs are disposed to move the discs transversely outward from the tubular member to be spaced from the tubular member as shown by the dashed portion of disc 21 in FIG. 3 and by the sectional view of FIG. 4b where it is seen that tubular member 2' is spaced completely from the discs 21. It should be noted that to obtain the desired corrugations, the tubular member may be drawn through a second set of discs in a similar manner after the initial corrugations are made.

Figure 10:
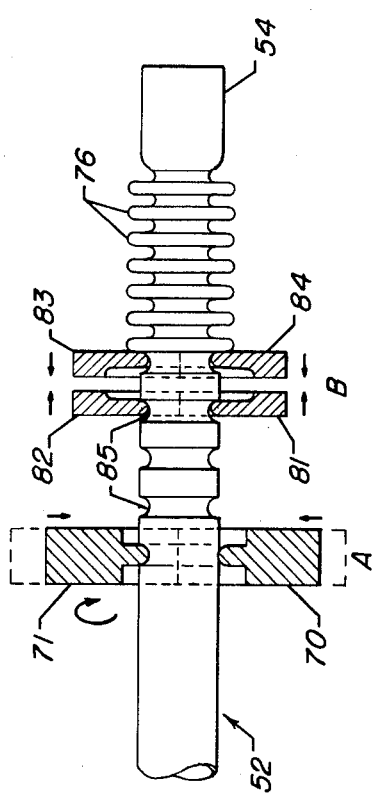
FIG. 10 of the drawing is a schematical elevational view, shown partially in section, of the method of forming annular corrugations.

The preferred mode of fabricating annular corrugations is schematically illustrated in FIG. 10 of the drawing. A tubular member 52 is moved into at least two stations A and B where two separate operations occur. In station A a pair of dies 70 and 71 having a resulting annular groove forming projection 72 are moved radially inward to contact tubular member 52. The axis of the dies 70 and 71 are offset in relation to the longitudinal axis of member 52. Dies 70 and 71 are caused to rotate with respect to the tubular member 52 and thus annular indentations 85 are formed in member 52.

At station B, four dies 81, 82, 83, and 84 having resulting circular openings are moved radially inwardly to contact two adjacent indentations 85. The axis of dies 81, 82, 83, and 84 are the same as the longitudinal axis of tubular member 52. After contact of the dies is made with indentations 85 the dies are moved axially together in the direction of the arrows shown to compress tubular member 52 to thus form resulting annular ridges or corrugations 76. Of course, to provide for uncorrugated end portions, the dies are kept away from the tubular member. This method results in a tubular member having uncorrugated end portions such as portion 54 of a lesser diameter than ridges 76.

The next step of fabricating the flexible connector includes disposing the sleeve of braided strands around the tubular member to completely encompass the corrugated central portion and to overlap at least the part of the uncorrugated end portions. The sleeve of braided strands is a standard item and may be manufactured by conventional methods known to those skilled in the art. As set out hereinbefore it may be of the same material as the tubular member, or on the other hand be of a different kind.

The next step includes disposing in a force fit manner the collars around the ends of the sleeve of braided strands over at least a part of the sleeve where the latter overlaps the uncorrugated end portions. For the embodiment of FIG. 1, this may include preforming a collar such as collar 6 to a size that would establish the required force fit, heating the collar 6 so its expansion will permit it to be slipped over the braid, and, subsequently, cooling it to establish the force fit.

For the embodiment of FIGS. 2 and 12 the preferable sequence of steps is to first corrugate the tubular member 2' or 52 and then gradually reduce its cross-sectional area in proximity to both ends over at least a part of the uncorrugated end portions to form the resulting frusta-conical portions 10 and 11 or 60 and 61. However, when the corrugations are formed in different manners it may be preferable to form the frusta-conical portions prior to corrugating the tubing or simultaneously on forming the corrugations. It may also be considered within the scope of this present invention to form the frusta-conical portions on the tubular member simultaneously upon disposing the collars in a force fit manner.

Figure 5:
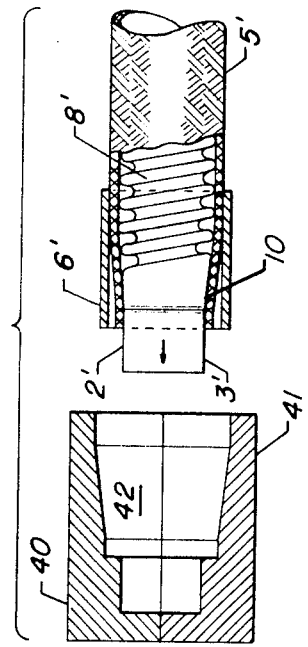
FIG. 5 is a partial sectional view of a swaging die set and the tubular member.
Figure 11:
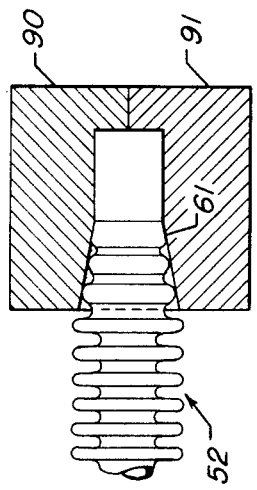
FIG. 11 of the drawing is a schematical elevational view, shown partially in section, of the swaging dies used to swage an annular corrugated tubular member.

To reduce the cross-sectional area of the tubular member, generally a swaging operation is called for. In FIG. 5 there is illustrated a pair of dies 30 and 31 which may be used in a swaging machine wherein they would be reciprocated toward and away from each other as the tubular member 2' were inserted into the aperture 32 of the dies. In FIG. 11 similar dies 90 and 91 are shown to form the frusta-conical portion 61 of tubular member 52.

The step of reducing the cross-sectional area of the tubular member or, in other words the swaging operation may be accomplished in other than the described manner for the method as set forth herein is given for illustrative purposes only. For example, during the actual operation of swaging, more dies may be used to attain the desired shape which in this case is merely the shape of the aperture 32. Or, instead of a reciprocating swaging machine, one utilizing vibrating motion may be utilized. After the swaging operation of FIG. 5, the tubular member 2' would appear like the tubular member 2' of FIGS. 2 and 6 and as shown it would have frusta-conical portions 10 and 11, spaced from the ends of the tubular member, and reduced end portions 3' and 4' of cross-sectional area equal to the smallest cross-sectional area of section 10.

Figure 6:
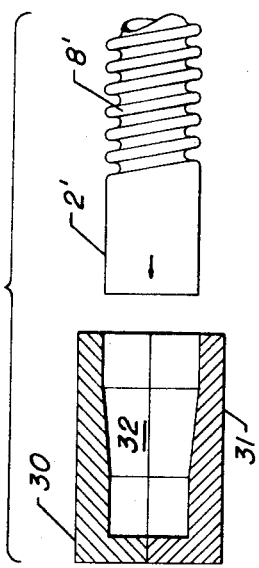
FIG. 6 is a partial sectional view of a swaging die set used in a subsequent step and the tubular member with the sleeve of braided material and collar disposed therearound.
Figure 7:
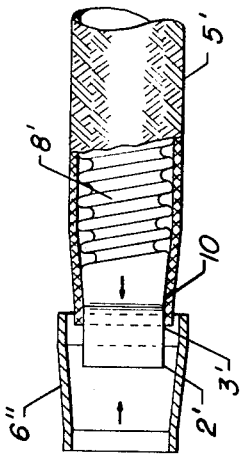
FIG. 7 is a partial sectional view of the tubular member with a sleeve of braided material and a preformed collar.

One mode of disposing the collar 6' in a forced fit manner is illustrated in FIG. 6 where another swaging operation is schematically represented. In this case, the dies 40 and 41 have an aperture 42 which is sized to swage the collar 6' down to a size where a force fit would result. In other words, if the end of the tubular member 2' with the braid 5' and a cylindrically shaped collar 6' were placed within the dies as the swaging machine operated, the collar would be reduced in cross-sectional area to correspond with aperture 42. Aperture 42 is sized to establish a force fit of collar 6' onto the sleeve 5' and tubular member 2'. The resulting flexible connector is illustrated in FIG. 2 of the drawing. The same procedure would also apply to the annular corrugated member 52. Another mode of establishing the force fit of the collar on the sleeve and tubular member is illustrated in FIG. 7. There a collar 6'' is preformed to correspond to cross-sectional areas that would establish a force fit if placed over a corresponding part of the sleeve 5' and the tubular member 2'. The collar 6'' may be heated than inserted over its corresponding position on the sleeve, and then, subsequently, cooled to establish the force fit, or, on the other hand, it may be cold forced over the corresponding portion on the sleeve by a punch operation.

Figure 9:
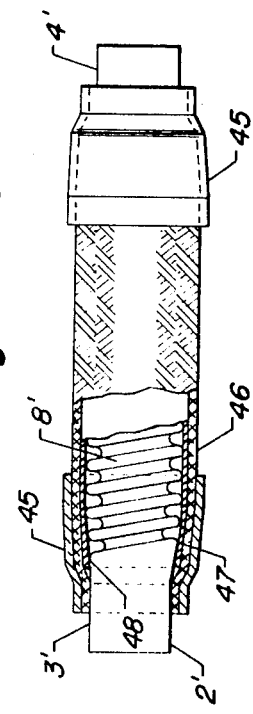
FIG. 9 is an elevational view, shown partially in section, of a modified embodiment of FIG. 2, wherein a sound dampening sleeve is placed between the sleeve of braided strands and the tubular member.
Figure 8:
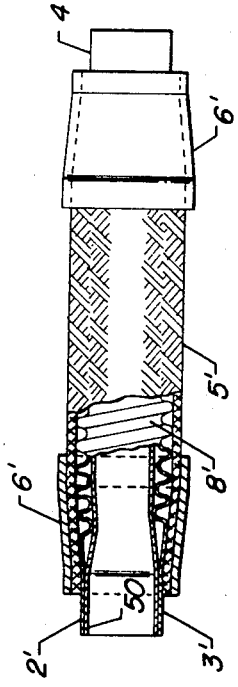
FIG. 8 is an elevational view, shown partially in section, of a modified embodiment of FIG. 2, wherein a liner is attached to the interior of the tubular member.

With reference to FIGS. 8 and 9 of the drawing, there are shown modified embodiments of the embodiment of FIG. 2. In FIG. 8 there is shown the embodiment of FIG. 2 with the addition of a liner 50. The liner may be a soft resilient material which is attached to the interior of tubular member 2' and may if desired fill the convolutions. In that case, the liner material may serve the purpose of dampening sound waves through the flexible connector. The attachment of liner 50 may be achieved by means of a suitable adhesive joint around the interior of the uncorrugated portions 3' and 4' of tubular member 2' or, on the other hand, by mechanical means, such as wedging a ferrule against the interior of the liner 50 to maintain it in place. In those cases in which the connector of FIG. 8 is used to carry a corrosive fluid, the liner 50 may be an inert material in the presence of the particular corrosive fluid, to thereby provide protection for the interior of tubular member 2'.

In FIG. 9 the modification of FIG. 2 is manifested by the fact that a sleeve of soft resilient material 47 is placed around the corrugated portion 8' of tubular member 2' prior to the placement of the sleeve 46. It may be affixed to the outer surface of the uncorrugated end portion 3' at 48 by a suitable adhesive during fabrication or may also if desired fill the convolutions. The sleeve 47 will act to damp sound waves and other vibrations that are impressed upon the connector, thus preventing transmission of such types of energy through any piping system. Moreover, after the connector is manufactured, the flexibility of the corrugated portion 8' of tube 2' co-acts with the resiliency of the sleeve 47 to further the vibration isolating characteristics of the connector. The sleeve 47 may be fabricated from a number of suitable materials; synthetic rubber, for example, of a suitable stiffness for the particular application may usefully be employed. Of course, other modifications in FIG. 9 are necessary to locate the resilient material 47 between the braided material 46 and the tubular member 2'. In other words, the sleeve of braided strands 46 must have a larger diameter than in the embodiment of FIG. 2 and likewise the collar 45 must be of a different cross-sectional shape to fit around the sleeve of braided strands and to establish a suitable force fit connection with the uncorrugated portions 3' and 4'.

It is also contemplated that the embodiments of FIG. 8 and FIG. 9 be combined into a further modified embodiment, utilizing both the sleeve of resilient material between the sleeve of braided strands and tubular member and also the liner material within the tubular member. It is also contemplated that the same or a different resilient material may be applied over the braid to provide for a smooth easily cleaned surface.

From the foregoing description it is seen that a flexible connector reinforced by a sleeve of braided material is fabricated by mechanical methods and the resulting flexible connector does not include structure which may establish problems of leakage and/or failure due to improper component attachment. Since the component connection is mechanical in nature, it will not fail when subjected to subsequent careless hot installation procedures.

It is to be noted that the specific examples herein shown and described are illustrative only and any variations in structure, proportions, and member thickness should be considered to form a part of this invention insofar as a fall within the spirit and scope of the claims.

I claim as my invention:

1. A method of fabricating a reinforced flexible connector in a manner eliminating soldering or other heat fusing operations, which comprises the steps of:
    a. corrugating the central portion of a tubular member whereby the resulting corrugations will provide flexibility in said central portion thereof and whereby the end portions of said tubular member will be uncorrugated;
    b. placing a sleeve of braided strands around said tubular member to completely encompass said corrugated central portion thereof and to overlap at least a part of said uncorrugated end portions; and,
    c. disposing in a force fit manner a collar around each end of said sleeve of braided strands over at least a part of said sleeve where the latter overlaps said uncorrugated end portion to thereby mechanically secure said sleeve of braided strands in a fixed relationship with said uncorrugated end portions of said tubular member, whereby said sleeve of braided strands will provide a flexible reinforcement for said corrugated central portion of said tubular member.

2. The method of claim 1 further characterized in that prior to step (b) the tubular member is gradually reduced in cross-sectional area in proximity to both ends over at least a part of said uncorrugated end portions thereof to form spaced apart frusta-conical portions decreasing in cross-sectional areas towards the ends of said tubular member and in that during step (b) each end of said sleeve is caused to overlap at least a part of each of the frusta-conical portions thereof.

3. The method of claim 2 further characterized in that the frusta-conical portions are formed to be spaced from the ends of said tubular member and the remaining part of the uncorrugated end portions of said tubular member are reduced in cross-sectional area to the smallest cross-sectional area of said frusta-conical portions.

4. The method of claim 2 further characterized in that during step (c) each of said collars is disposed over at least a part of said sleeve where the latter overlaps said frusta-conical portion.

5. The method of claim 1 further characterized in that step (a) includes forming helical corrugations by drawing said tubular member through a first and second axially spaced apart generally synchronously rotating annular forming discs radially offset one from the other transverse to said tubular member, wherein the corrugations are formed by indenting said tubular member by rotating said first disc with respect to said tubular member.

6. The method of claim 5 further characterized in that to provide the uncorrugated end portions of said tubular member said discs are caused to be moved transversely outward to be spaced from said tubular member as the latter is drawn through said discs.

7. The method of claim 1 further characterized in that step (c) comprises disposing each of said collars over said sleeve and thereafter swaging said collar down to cross-sectional areas that effectuate a force fit.

8. The method of claim 1 further characterized in that a sleeve of soft resilient material is placed around said tubular member to completely encompass and fill the corrugations of said corrugated central portion thereof and to overlap at least a part of said uncorrugated end portions prior to step (b).

9. The method of claim 1 further characterized in that a liner is attached to the interior of said tubular member filling the corrugations.

10. The method of claim 1 further characterized in that step (a) includes forming annular corrugations.

* * * * *